United States Patent
Perrin et al.

(10) Patent No.: US 11,957,274 B2
(45) Date of Patent: Apr. 16, 2024

(54) FOAMING DEVICE

(71) Applicant: SOCIÉTÉ DES PRODUITS NESTLÉ S.A., Vevey (CH)

(72) Inventors: Alexa Perrin, Savigny (CH); Alexandre Perentes, Sullens (CH)

(73) Assignee: Societe des Produits Nestle S.A., Vevey (CH)

(*) Notice: Subject to any disclaimer, the term of this patent is extended or adjusted under 35 U.S.C. 154(b) by 0 days.

(21) Appl. No.: 17/741,715

(22) Filed: May 11, 2022

(65) Prior Publication Data

US 2022/0265091 A1 Aug. 25, 2022

Related U.S. Application Data

(62) Division of application No. 15/573,539, filed as application No. PCT/EP2016/063788 on Jun. 15, 2016, now abandoned.

(30) Foreign Application Priority Data

Jun. 16, 2015 (EP) .................................... 15172423

(51) Int. Cl.
  *A47J 43/046* (2006.01)
  *A47J 43/08* (2006.01)
  *B01F 27/808* (2022.01)
  *A47J 31/44* (2006.01)

(52) U.S. Cl.
  CPC ......... *A47J 43/0465* (2013.01); *A47J 43/085* (2013.01); *B01F 27/808* (2022.01); *A47J 31/4496* (2013.01)

(58) Field of Classification Search
  CPC .. A47J 43/0465; A47J 43/085; A47J 31/4496; B01F 28/808
  USPC .......................................................... 366/249
  See application file for complete search history.

(56) References Cited

U.S. PATENT DOCUMENTS

| | | | |
|---|---|---|---|
| 2003/0198124 A1 | 10/2003 | Glucksman et al. | |
| 2007/0133345 A1* | 6/2007 | Zarom | B01F 35/92 366/289 |
| 2007/0221068 A1* | 9/2007 | Boussemart | A47J 27/004 99/279 |
| 2008/0166463 A1 | 7/2008 | Green et al. | |

(Continued)

FOREIGN PATENT DOCUMENTS

| DE | 202537174 | 11/2012 |
|---|---|---|
| DE | 102013224786 | 3/2015 |

(Continued)

OTHER PUBLICATIONS

English Translation of Chinese Office Action for Chinese Patent Appl No. 201680028622.2 dated Apr. 9, 2020.

Primary Examiner — Marc C Howell
(74) Attorney, Agent, or Firm — K&L Gates LLP

(57) ABSTRACT

A device for producing fluid foam includes a container where the fluid can be accommodated, and includes a foaming tool rotatable in the inner volume of the container. The texture and the porosity of the fluid foam obtained are provided by shear energy coming from Couette Flow effect and depend on the dimension of the foaming tool with respect to the inner volume of the container, on the location of the foaming tool from the bottom of the container and on the rotation speed of the foaming tool.

19 Claims, 13 Drawing Sheets

(56) References Cited

U.S. PATENT DOCUMENTS

| | | | |
|---|---|---|---|
| 2010/0326284 A1* | 12/2010 | Volz | A47J 27/004 99/323.1 |
| 2011/0262606 A1* | 10/2011 | Blondel | A47J 27/004 426/474 |
| 2012/0300575 A1 | 11/2012 | Tsai | |
| 2013/0101982 A1 | 4/2013 | Goodwin et al. | |
| 2016/0367071 A1 | 12/2016 | Dollner et al. | |

FOREIGN PATENT DOCUMENTS

| | | | |
|---|---|---|---|
| DE | 202014100794 | 7/2015 | |
| GB | 2504493 | 2/2014 | |
| WO | 2006050900 | 5/2006 | |
| WO | 2014096183 | 6/2014 | |
| WO | WO-2014096183 A1 * | 6/2014 | A23C 9/1524 |

* cited by examiner

FOAMING DEVICE

CROSS REFERENCE TO RELATED APPLICATIONS

The present application is a divisional of U.S. patent application Ser. No. 15/573,539 filed Nov. 13, 2017, which is a National Stage of International Application No. PCT/EP2016/063788 filed Jun. 15, 2016, which claims priority to European Patent Application No. 15172423.4 filed Jun. 16, 2015, the entire contents of which are incorporated herein by reference.

FIELD OF THE INVENTION

The present invention is directed to a foaming device for foaming a fluid, more particularly the invention is directed to device for foaming milk.

BACKGROUND

Foams consist of two phases, an aqueous phase and a gaseous (air) phase, so fluid foam is therefore a substance which is formed by trapping many gas bubbles in a fluid structure. Producing a fluid foam involves not only the generation of these gas bubbles, but also the packing and the retention of these bubbles into the overall fluid structure in order to provide a stable foam.

When foaming a fluid, the main difficulties to be faced are to produce the foam desired in a controlled and repeatable way and also to stabilize the foam and to keep it stable for a given period of time.

Devices for foaming milk are known in the state of the art, wherein the foaming of the milk is typically carried out by a rotating part moving inside a reservoir or container where milk is arranged. Typically, this rotating part is configured as a whisk which is provided at the bottom part of the container. Milk foaming occurs by agitation of the milk which in turn traps air inside the liquid film. However, the problem with these known devices is that a precise control and regulation of the characteristics of the foam obtained is very hard to achieve, and repeatability of the process becomes a primary issue.

Also, the state of the art includes devices that inject hot steam into milk that is filled into a container, in order to cause foaming. However, the problem of these devices is that they cannot make either a precise control of the foaming process followed, and repeatability is again an issue, unless you are really an expert (usually called Barista) and you know how to use the system for obtaining the required parameters you are exactly searching for.

Also, in the state of the art devices, there are several factors that influence the foaming of the milk as, for example, the speed of the rotating part or the temperature and/or pressure of the steam that is injected into the milk. These factors are difficult to understand, and are not easy to control accurately without building more complicated devices. Therefore, the milk foam of many simple state of the art foaming devices is often produced unreliably, i.e. the properties of the foam like volume, foam porosity, foam stability etc. differ from one process to another.

Current known devices in the state of the art either use a very small whisk or foaming tool that rotates at a very high speed or, when using a whisk of a bigger diameter, they are configured for being manually operated: in fact, they are not rotated but moved vertically, up and down, directly from the consumer, which is time consuming and which does not provide an accurate and controlled foaming process, neither an optimum fluid foam. Moreover, known foaming devices in the state of the art, particularly those with a larger whisk and manually operated, when they need to provide a thick foam, for example, Chantilly, they need to depart from cream otherwise they will never arrive at providing such a thick foam, so departing from milk fluid they only can make liquid foam but not arriving to a thicker one neither can they manage to control and master different foaming properties and a consistent repeatability departing from a same fluid.

Therefore, the present invention is directed to a device for foaming a fluid, preferably for foaming milk in a reliable and repeatable way and using a foaming process that is controlled and accurate, and avoiding the drawbacks of the known prior art.

SUMMARY

According to a first aspect, the invention relates to a device for producing fluid foam comprising a container where the fluid can be accommodated, and a foaming tool being rotatable in the inner volume of the container. According to the invention, the texture and the porosity of the fluid foam obtained are provided by shear energy coming from Couette Flow effect and depend on the dimension of the foaming tool with respect to the inner volume of the container, on the location of the foaming tool from the bottom of the container and on the rotation speed of the foaming tool.

Preferably, the foaming tool is arranged at a distance from the bottom of the container comprised between H/2 and H/4, where H is the height of the fluid inside the container. Also according to the invention, the dimension of the foaming tool is preferably comprised between half and close to the inner dimension of the container measured at the location where the foaming tool is arranged inside the container.

Typically, the foaming tool is configured as a whisk or as a disc and the inner shape of the container is cylindrical or frusto-conical. In the device of the invention, the foaming tool rotates in the inner volume of the container at a speed preferably comprised between 2500 rpm and 4000 rpm.

The foaming tool of the invention can be arranged either centred or offset with respect to the centre of the inner volume of the container. Also, the device typically further comprises a driving unit configured to drive in rotation the foaming tool inside the container. The driving unit can comprise a motor mechanically coupled to the foaming tool to entrain it in rotation or it can be configured to generate a magnetic field in response to which the foaming tool is made to rotate inside the container.

In a preferred embodiment of the invention, the device further comprises a control unit to control the temperature of the fluid and/or the rotational speed of the foaming tool and/or the positioning of the foaming tool with respect to the bottom of the container and/or the dimension of the foaming tool and/or if the foaming tool is centred or offset inside the container and/or the total height of the fluid in the container.

Also preferably, the device further comprises a heating unit able to heat the fluid inside the container.

According to the invention, the foaming tool comprises at least one aperture to compensate the suction effect with respect to the bottom of the container. More preferably, the foaming tool comprises two apertures symmetrically arranged.

Typically, the device of the invention further comprises one or a plurality of disturbing elements arranged on the foaming tool and/or on the inner walls of the container and/or on the lower side of the foaming tool and/or on the bottom of the container. According to a preferred embodiment, the disturbing elements are configured as undulations, having a depth comprised between 0.5 mm and 5 mm, preferably in the order of 1 mm.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION

Figure 1A:
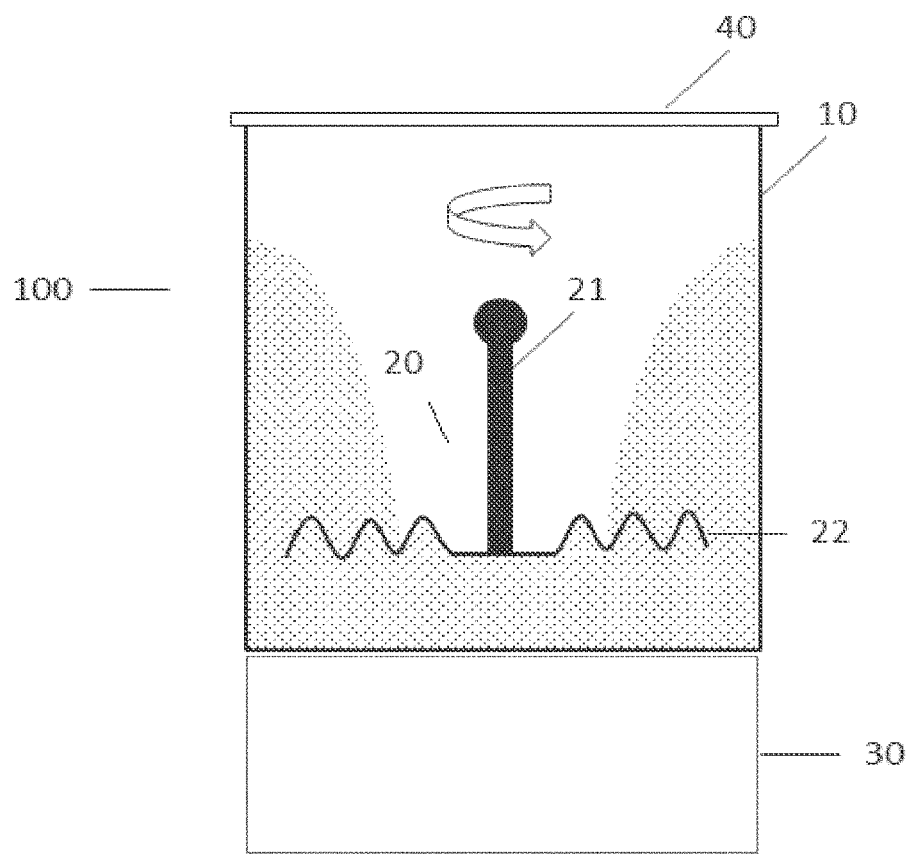
FIGS. 1a-b-c show different schematic views of a foaming device according to the present invention.
Figure 1B:
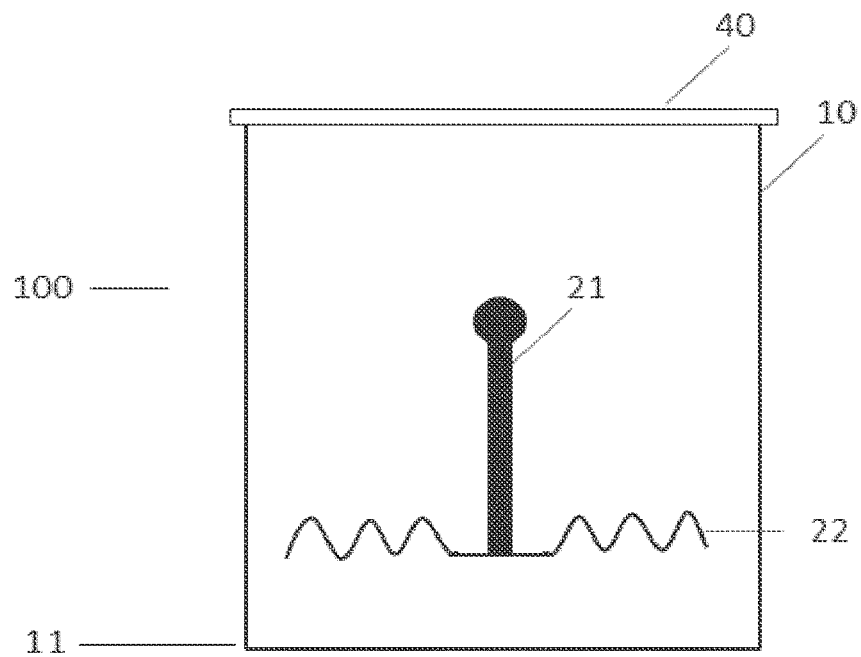
Figure 1C:
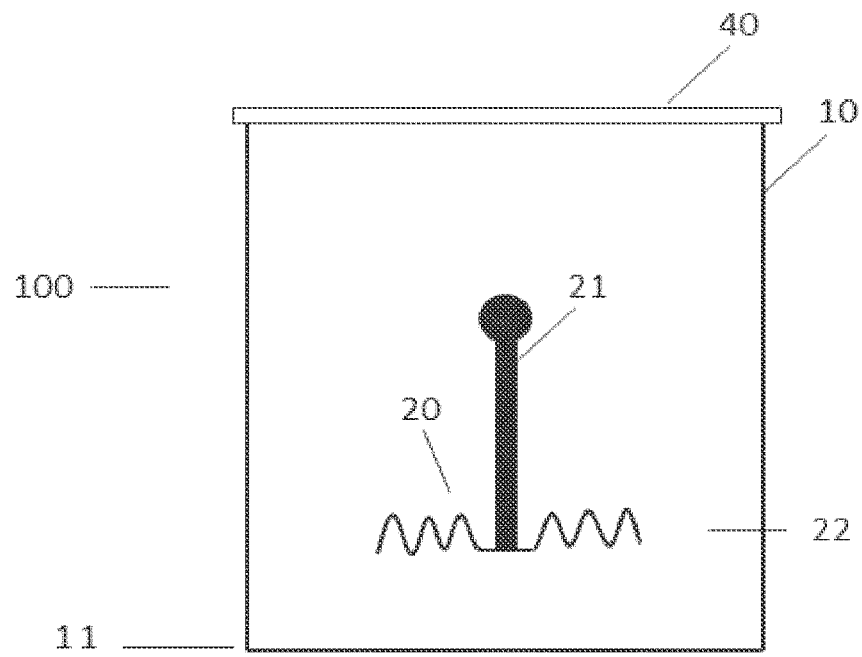

With reference to FIGS. 1a-b-c attached, the present invention refers to a foaming device 100 comprising a container 10 where a fluid to be foamed is arranged and a foaming tool 20. The foaming tool 20 moves with respect to the container 10 which is static, typically rotating around a shaft 21. The foaming tool 20 is configured as a disc or a whisk 22, and comprises a vertical shaft 21 around which it rotates, arranged in the center of the whisk 22. Besides, the foaming device 100 of the invention comprises a driving unit 30 configured to entrain in rotation the foaming tool 20: in fact, it entrains in rotation the vertical shaft 21 which is joined to the whisk 22.

Preferably, according to the invention, the foaming tool 20 is arranged centered inside the container 10, meaning that the vertical shaft 21 will be arranged at the center of the container 10. However, it is also possible that the foaming tool is arranged de-centralized with respect to the inner volume of the container 10, i.e. the vertical shaft 21 will be then arranged offset with respect to the center of the container The driving unit 30 of the invention can either comprise a motor directly coupled and entraining in rotation the vertical shaft 21 or it can also be mechanically decoupled from the foaming tool 20: in the second case, the driving unit 30 will generate a magnetic field in response to which the whisk 22 will be made moveable inside the container 10 around the vertical shaft 21. Therefore, in this case, the driving unit 30 and the whisk 22 will be separated a certain distance such that it will allow the whisk 22 be at least partially positioned inside the magnetic field generated by the driving unit 30. In this embodiment, the driving unit 30 will preferably comprise at least one first magnet and the whisk 22 will also comprise at least one second magnet, such that the at least one first magnet and the at least one second magnet will be adapted to contactlessly transfer a rotation of the driving unit 30 onto the whisk 22. Due to the fact that the whisk 22 is driven magnetically, there will be less friction in the foaming tool 20 (between the shaft 21 and the whisk 22) resulting in less energy consumption and a longer life time of the device.

Typically, the driving unit 30 is configured in such a way that it provides a base onto which the foaming device 100 can be placed, as represented in FIG. 1a.

The whisk 22 is typically arranged close to the bottom 11 of the container 10, at a certain distance that is a function of the total height of the fluid inside the container 10, indicated by the reference H. The distance to the bottom 11 of the container 10 is given from the lower side of the whisk 22, when the whisk is arranged inside the container 10. Depending on the distance from the lower side of the whisk to the bottom of the container 10, which is a function of the value of H, the texture and the porosity (size of bubbles of air within the texture of the foam) of the fluid (milk) foam obtained will be different, as represented in graphs attached in FIGS. 6a-d, 7a-d and 8a-d (the graphs are made using milk fluid). The lower the distance from the lower side of the whisk to the bottom of the container 10, the more liquid the foam texture obtained is and with bubbles having a smaller diameter. The higher this distance from the lower side of the whisk to the bottom of the container 10, the thicker the texture of the foam obtained and the bubbles are of a higher diameter. According to the invention, the optimal location of the whisk with respect to the bottom of the container is comprised between 3H/4 and H/4, more preferably at around H/2. Other variables will also be taken into consideration for the foaming texture and porosity, as it will be further explained in detail: the distance from the external diameter of the whisk 22 to the internal walls of the container 10 and the rotation speed of the whisk 22.

Figure 6A:
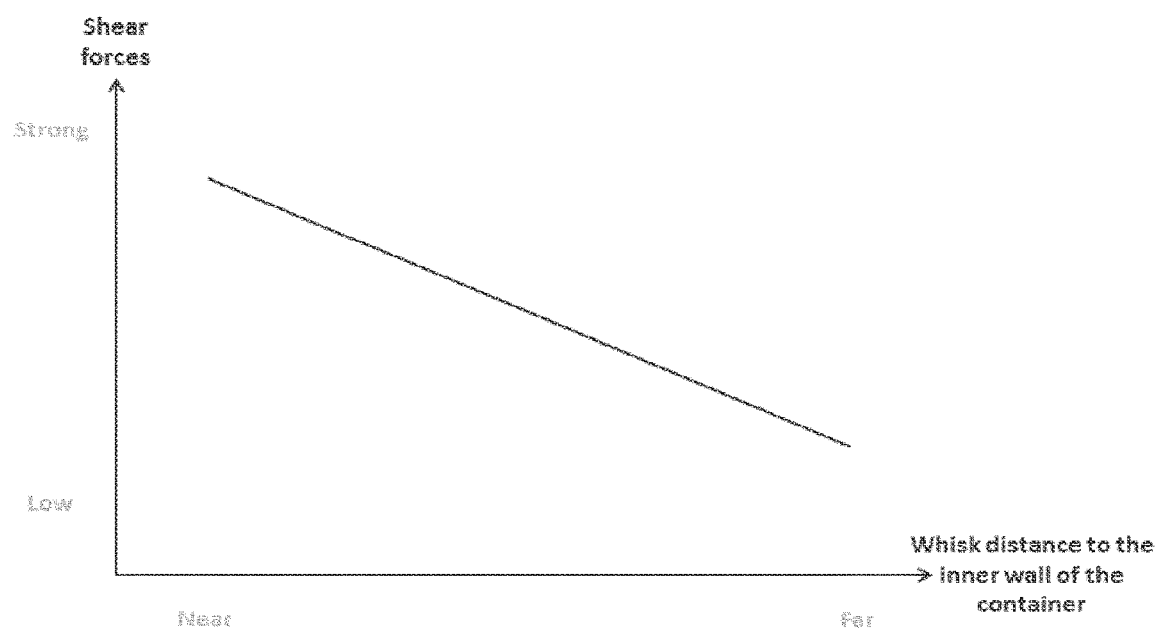
FIGS. 6a-b-c-d show different graphs with the evolution of foaming parameters depending on the size of the foaming tool, for the same foaming tool shape rotating at the same speed, in a foaming device according to the present invention.

FIG. 6a shows the evolution of the shear forces in the fluid comprised inside the container 10 when the whisk 22 changes its size, always for the same shape of whisk and rotating at the same speed: the graph shows that when the whisk distance to the inner walls of the container (axis X) is higher, the shear forces are lower.

Figure 6B:
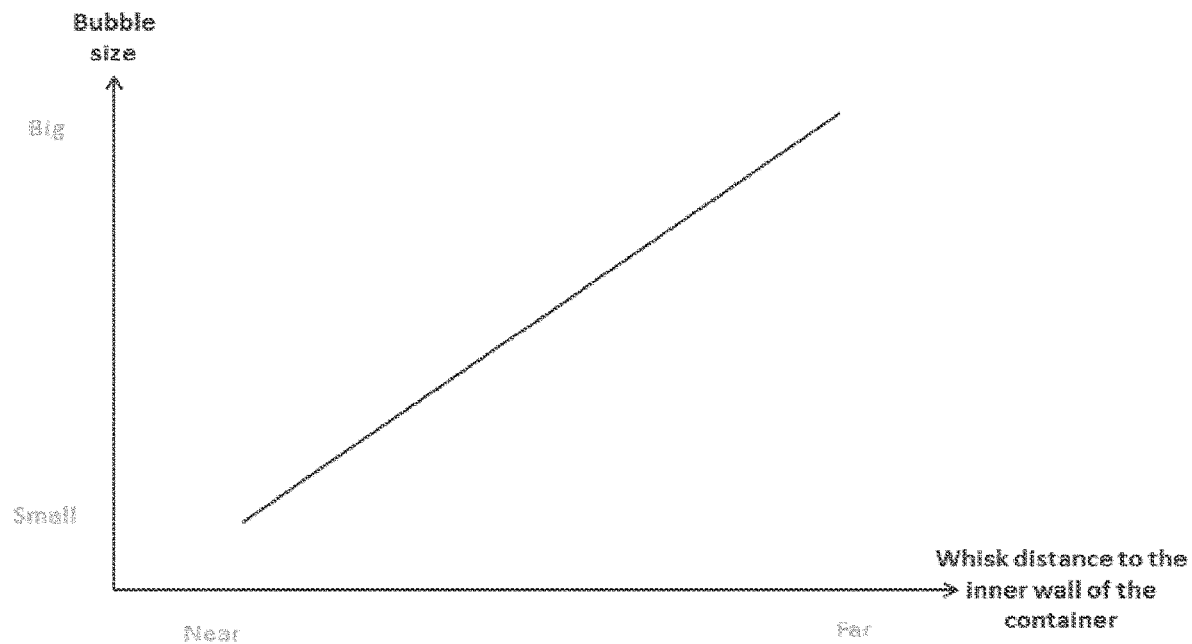

FIG. 6b shows the evolution of the bubbles size in the fluid comprised inside the container 10 when the whisk 22 changes its size, always for the same shape of whisk and rotating at the same speed: the graph shows that when the whisk distance to the inner walls of the container (axis X) is higher, the size of the bubbles is bigger.

Figure 6C:
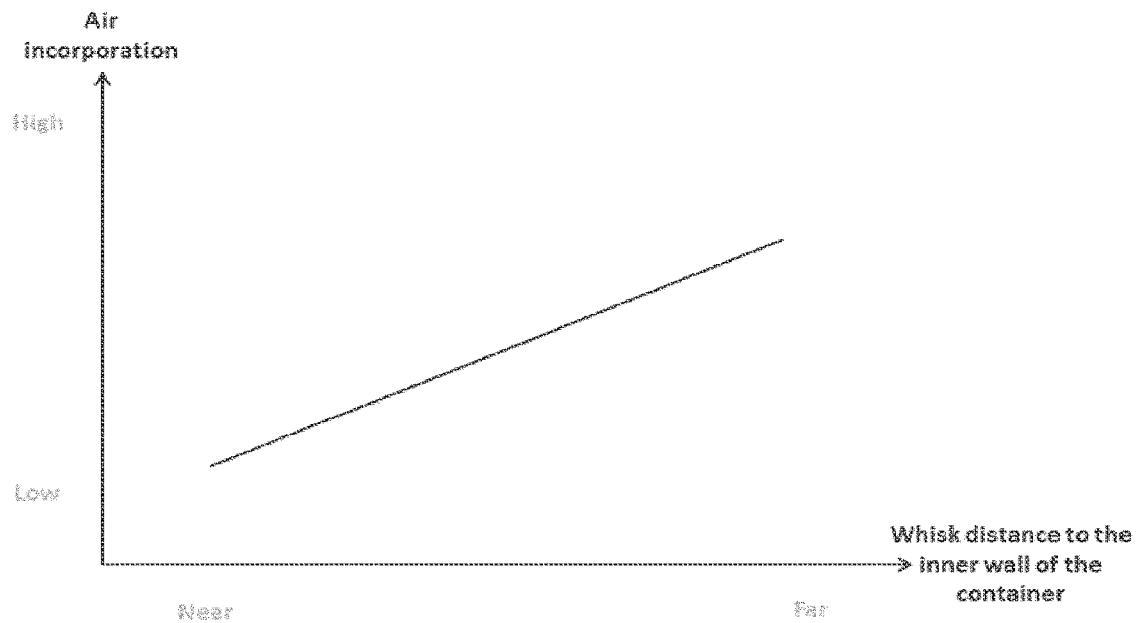

FIG. 6c shows the evolution of the air incorporation in the fluid comprised inside the container 10 when the whisk 22 changes its size, always for the same shape of whisk and rotating at the same speed: the graph shows that when the whisk distance to the inner walls of the container (axis X) is higher, the air bubbles inside the fluid are of bigger size.

Figure 6D:
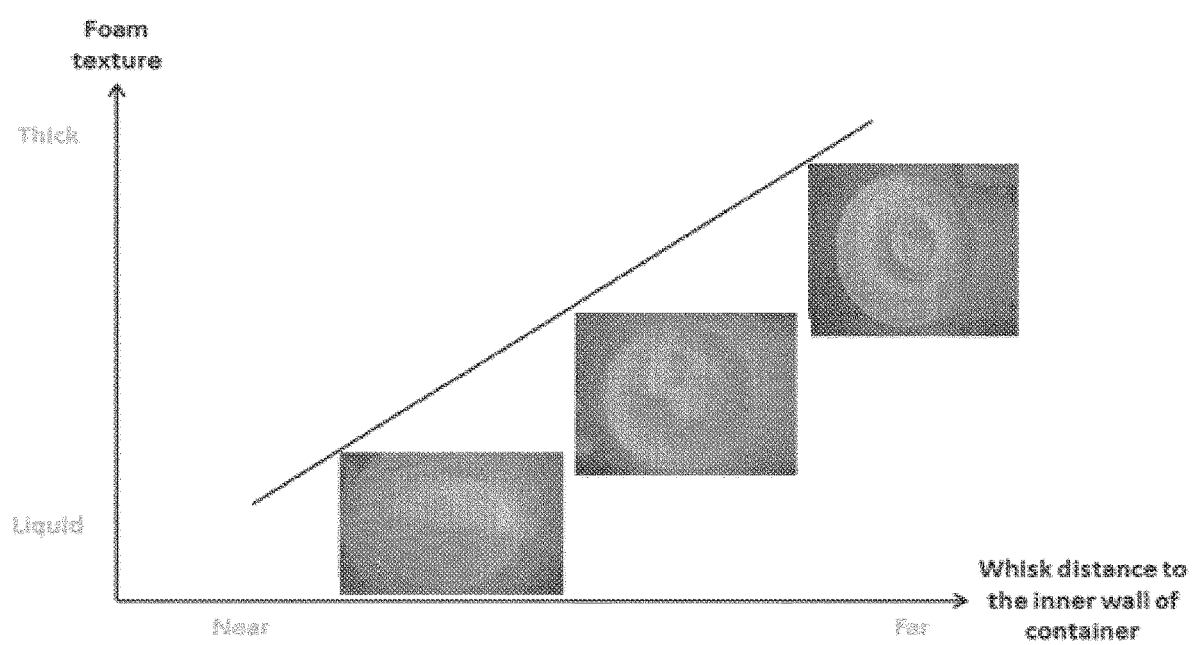

FIG. 6d shows the evolution of the foam texture in the fluid comprised inside the container 10 when the whisk 22 changes its size, always for the same shape of whisk and rotating at the same speed: the graph shows that when the whisk distance to the inner walls of the container (axis X) is higher, the texture of the fluid foam is thicker.

Figure 7A:
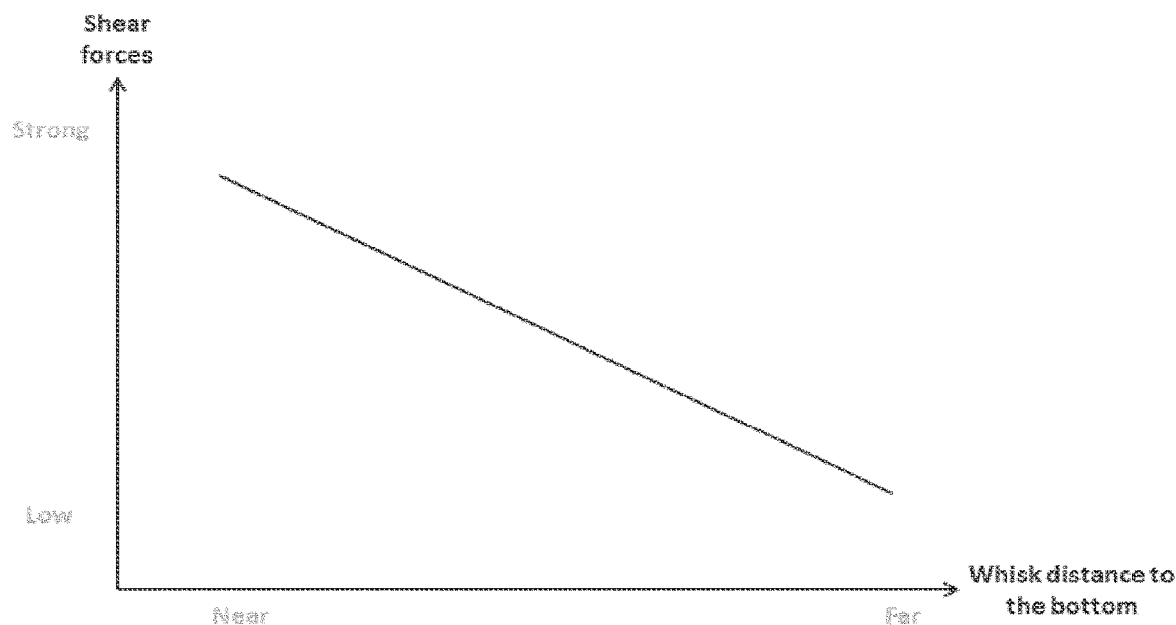
FIGS. 7a-b-c-d show different graphs with the evolution of foaming parameters depending on the positioning of the foaming tool inside the container, for the same foaming tool shape rotating at the same speed, in a foaming device according to the present invention.

FIG. 7a shows the evolution of the shear forces in the fluid comprised inside the container 10 when the whisk 22 changes its position with respect to the bottom 11 of the container 10, always for the same shape of whisk and rotating at the same speed: the graph shows that when the whisk height to the bottom 11 (axis X) is higher, the shear forces are lower.

Figure 7B:
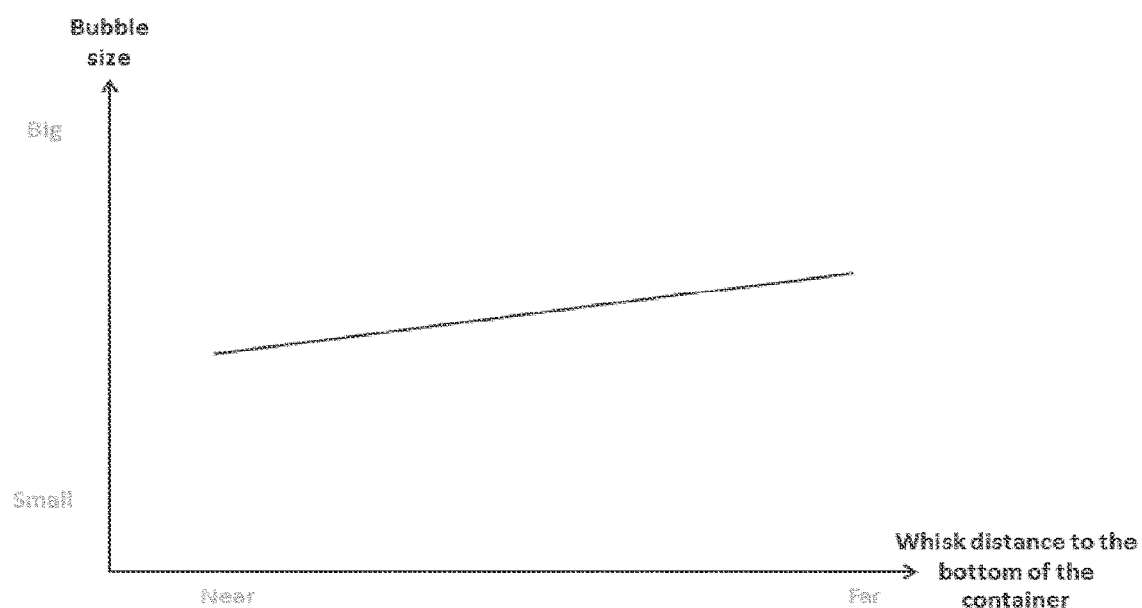

FIG. 7b shows the evolution of the size of the bubbles in the fluid comprised inside the container 10 when the whisk 22 changes its position with respect to the bottom 11 of the container 10, always for the same shape of whisk and rotating at the same speed: the graph shows that when the whisk height to the bottom 11 (axis X) is higher, the bubbles are bigger.

Figure 7C:
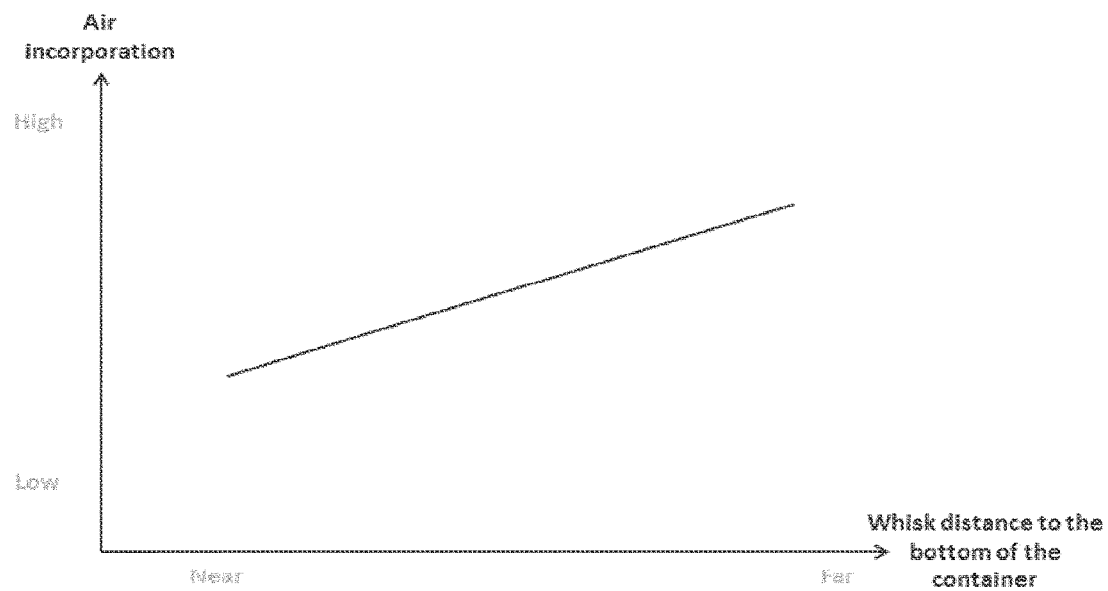

FIG. 7c shows the evolution of the air incorporation in the fluid comprised inside the container 10 when the whisk 22 changes its position with respect to the bottom 11 of the container 10, always for the same shape of whisk and rotating at the same speed: the graph shows that when the whisk height to the bottom 11 (axis X) is higher, the shear air bubbles in the fluid foam are of a bigger size.

Figure 7D:
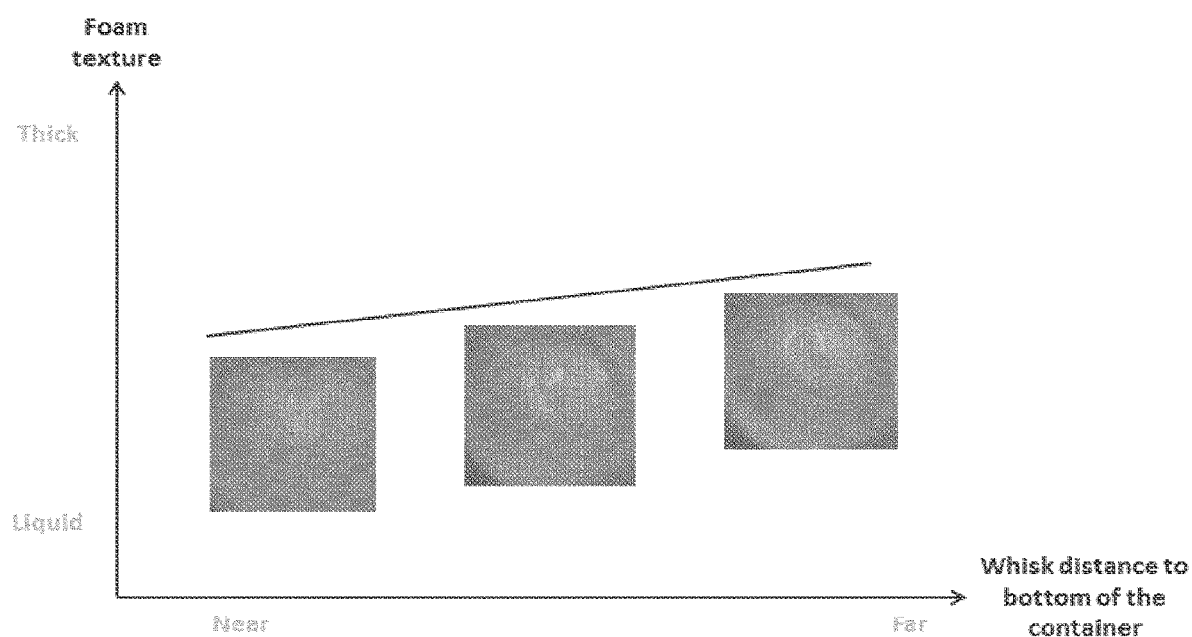

FIG. 7d shows the evolution of the foam texture in the fluid comprised inside the container 10 when the whisk 22 changes its position with respect to the bottom 11 of the container 10, always for the same shape of whisk and rotating at the same speed: the graph shows that when the whisk height to the bottom 11 (axis X) is higher, the fluid foam obtained is thicker.

Figure 8A:
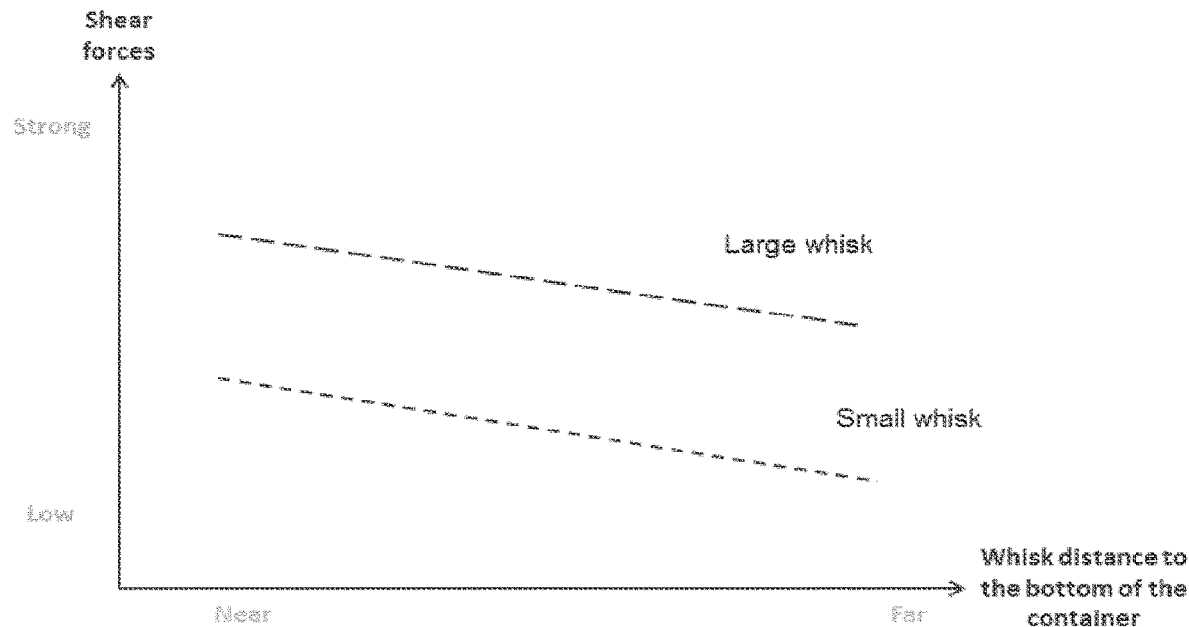
FIGS. 8a-b-c show different graphs with the evolution of foaming parameters compared for a large and a small foaming tool, in a foaming device according to the present invention.

FIG. 8a shows the evolution of the shear forces in the fluid comprised inside the container 10 for a large whisk (having almost the size of the inner walls of the container 10) and for a small whisk (with a size half of the total size of the inner walls of the container 10) when the whisk 22 changes its position with respect to the bottom 11 of the container 10, always for the same shape of whisk and rotating at the same speed.

Figure 8B:
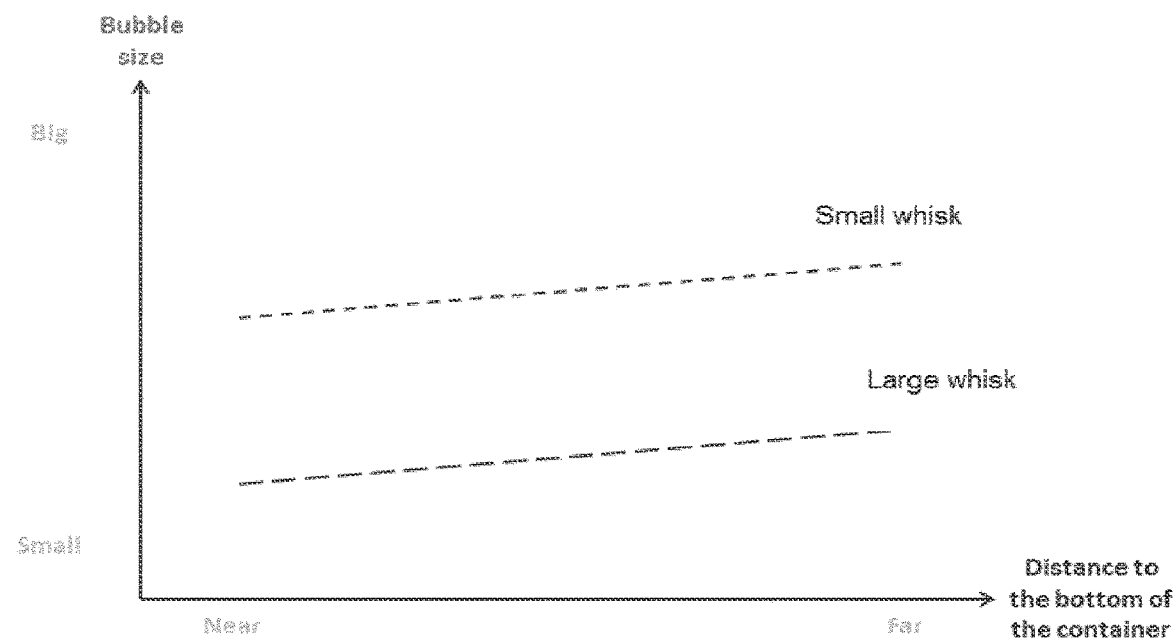

FIG. 8b shows the evolution of the bubbles size in the fluid comprised inside the container 10 for a large whisk (having almost the size of the inner walls of the container 10) and for a small whisk (with a size half of the total size of the inner walls of the container 10) when the whisk 22 changes its position with respect to the bottom 11 of the container 10, always for the same shape of whisk and rotating at the same speed.

Figure 8C:
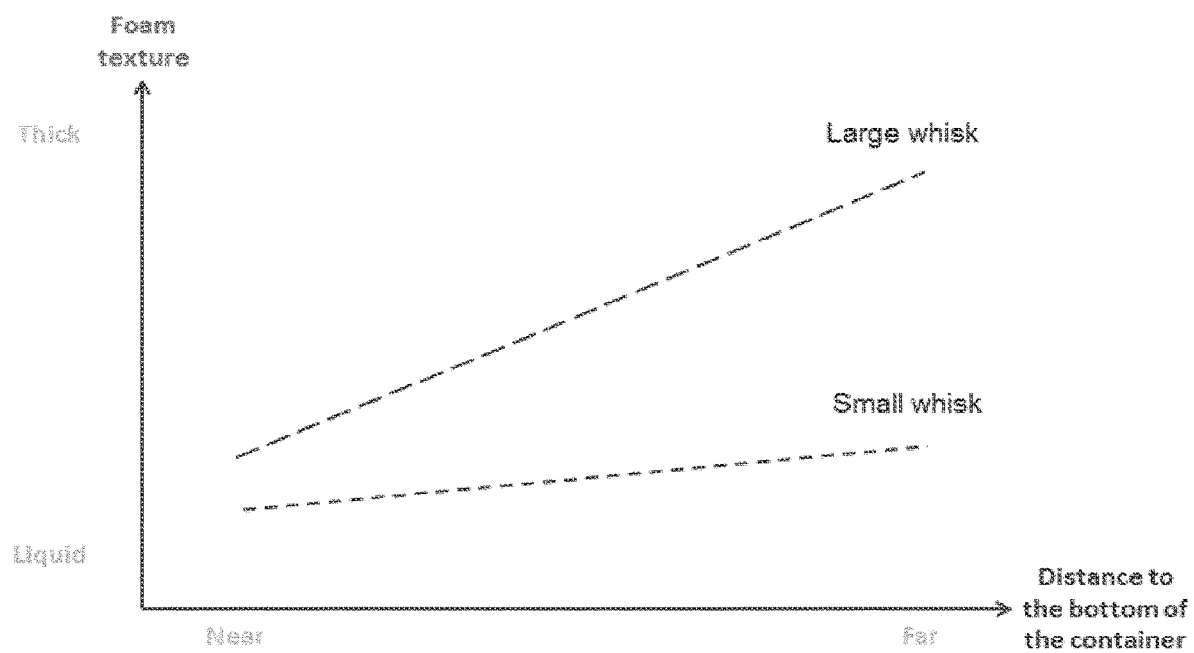

FIG. 8c shows the evolution of the foam texture in the fluid comprised inside the container 10 for a large whisk (having almost the size of the inner walls of the container 10) and for a small whisk (with a size half of the total size of the inner walls of the container 10) when the whisk 22 changes its position with respect to the bottom 11 of the container 10, always for the same shape of whisk and rotating at the same speed.

Using larger sizes of whisks, the diameter of the bubbles obtained is about 50 microns, when these whisks are arranged at H/2 from the bottom 11 of the container: if the whisk rotates at about 2500 rpm, micro foam is obtained; when the whisk rotates at a higher speed of about 4000 rom, Chantilly is obtained. The bubble size is similar for the two cases, independently on the rotational speed and on the type of foam obtained, so being consistent and allowing high repeatability. Consumers prefer typically thinner bubbles in the foam as they give a more creamy texture as the sensorial perception is better. Also, as Couette Flow principle is used in the invention, shear forces are higher: as a result, the fat globules in the fluid (typically milk) are broken and a more creamy taste is reached.

In the device of the invention, the values for H maximum and H minimum are also indicated, H being (as already described) the total height of the fluid in the container 10, before the foaming process starts. Preferably, a control unit (further explained) will also control this value H and that it is actually comprised within the maximum and minimum allowable values.

The diameter of the whisk 22 with respect to the internal diameter of the container 10 will also play an important role on the foaming properties: the distance between the external diameter of the whisk 22 and the internal walls of the container 10 modifies the foam properties obtained. When this distance is low, typically when the whisk diameter is very close to the inner diameter of the container 10, the foam obtained is very liquid and its bubbles inside have a small diameter. However, when the distance between the external diameter of the whisk 22 and the internal walls of the container 10 is bigger (this is the case typically when the whisk diameter is half the diameter of the inner part of the container 10), then the foam obtained is thicker and the bubbles have a bigger diameter. Preferably, according to the invention, the diameter of the whisk 22 is comprised between half the diameter of the inner walls of the container 10 and almost the diameter of said inner walls of the container 10, just allowing a certain gap so that the whisk can rotate without touching these internal walls. This gap distance between the inner walls of the container 10 and the maximum whisk dimension is typically in the order of around 0.5 mm.

When talking of foam properties, the foam obtained being liquid and having a small size of bubbles is typically known as a micro foam, and is the one used for preparing latte art compositions, for example. When talking of thicker foam with higher size of bubbles inside, we talk of really thick foam or even of Chantilly. One of the main advantages of the system of the invention is also to be able to provide Chantilly departing from milk, without the need of providing cream in the device that is then whipped and turned into Chantilly.

Typically, the device of the invention will be configured in such a way as to arrange the foaming tool or whisk 22 at a certain distance, preferably comprised between H/2 and H/4, and will modify the diameter size of the whisk so that, for example, with a diameter being half the size of the inner diameter of the container 10, thicker foam with bigger bubbles will be obtained. When the whisk 22 has a diameter very close to the inner diameter of the container 10, then liquid foam with low size bubbles will be provided. The reasoning for this is that bigger sizes of whisks provide bigger surfaces, so shear energy and shear forces from Couette Flow effect are higher, therefore the foam provided will be more liquid and the bubbles having a smaller size. However, such a device would be more complicated to do in practice, so the preferred embodiment of the invention fixed the size of the foaming tool and its position with respect to the bottom 11 of the container.

In fact, the position of the whisk inside the container 10 is less relevant with respect to the foaming properties of the fluid foam obtained: it is more relevant the distance of the whisk with respect to the inner volume of the container. This can be seen comparing FIGS. 6d and 7d: the curve in FIG. 6d has a higher slope than that in FIG. 7d: FIG. 7d uses in axis X the distance to the bottom 11 of the container, whereas FIG. 6d uses in axis X the distance to the inner walls of the container 10. In fact, it is the distance to the inner walls of the container the parameter that has the highest influence in the foaming of the fluid, more than the distance to the bottom 11 of the container. This is the reason why in the preferred embodiments of the present invention, large whisks are used, as the shear forces are higher (see FIG. 8a) and also the bubble size is smaller, therefore providing a finer foam (see FIG. 8b). Referring to FIG. 8c, it can also be seen that, with a large whisk, smaller variations in the distance with respect to the bottom 11 of the container 10 give as a result different foams, from liquid to thicker foams. In fact, the preferred embodiments of the invention fix both the size of the whisk (preferably a big whisk) and its location with respect to the bottom 11 of the container (typically at H/2) and it is only changing the speed that different foams (from liquid to thick foams are obtained), as already explained previously.

According to the invention, it has been found that the whisk arranged at H/2 with respect to the bottom 11 of the container provides optimal results with respect to air incorporation and shear forces in the fluid.

Figure 3:
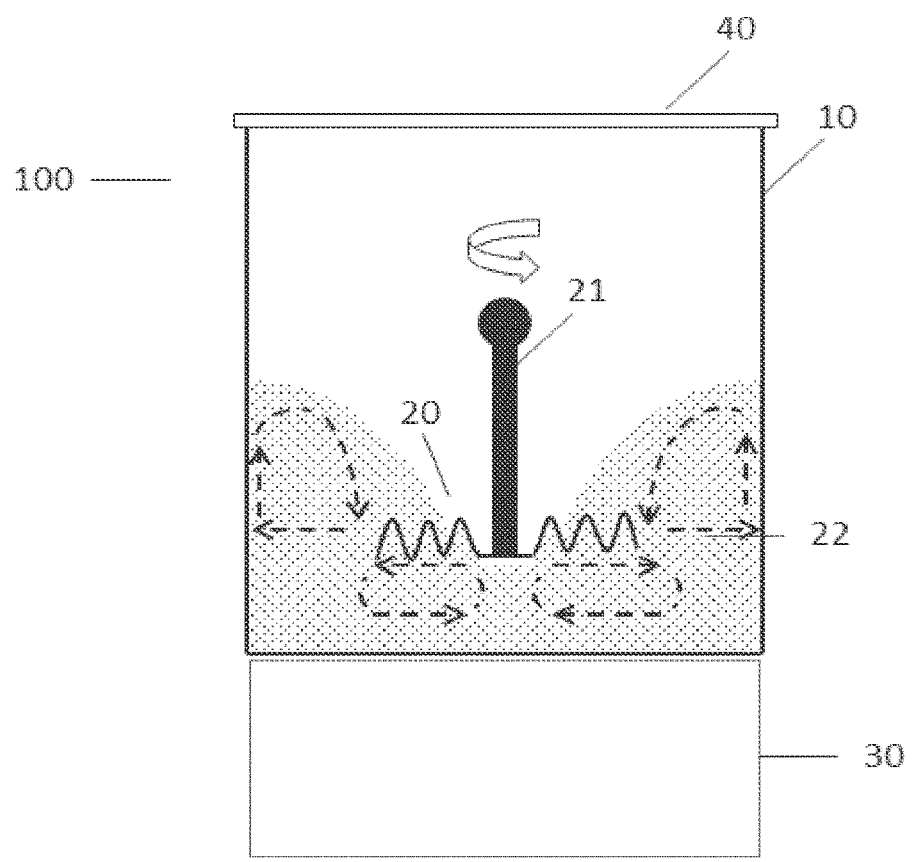
FIG. 3 shows an exemplary configuration of the distribution of the vortex effect in a foaming device according to the invention where the foaming tool is about half the size with respect to the inner volume of the container and rotates at a certain speed.
Figure 4:
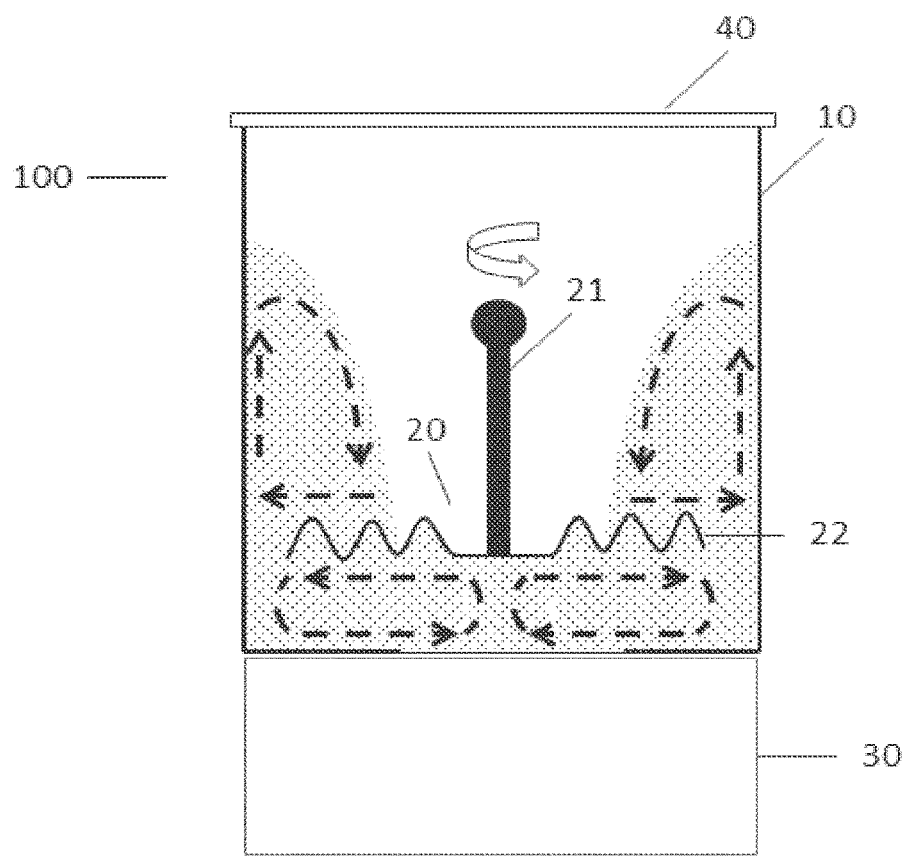
FIG. 4 shows an exemplary configuration of the distribution of the vortex effect in a foaming device according to the invention where the foaming tool is about the same size as the inner volume of the container and rotates at a certain speed.
Figure 5A:
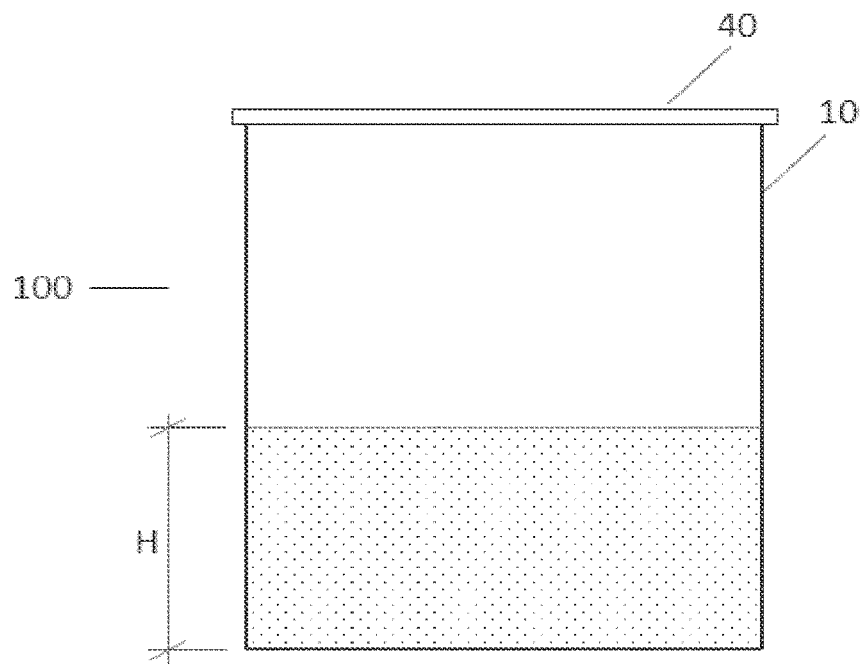
FIGS. 5a-b-c show exemplary configurations showing the container, the foaming tool and the arrangement of the foaming tool within the container, in a foaming device according to the present invention.
Figure 5B:
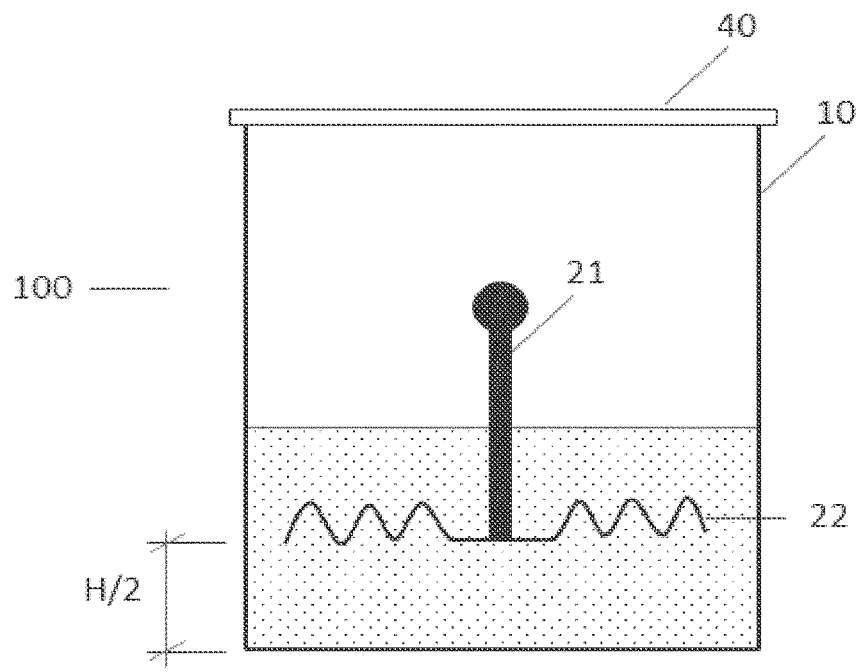
Figure 5C:
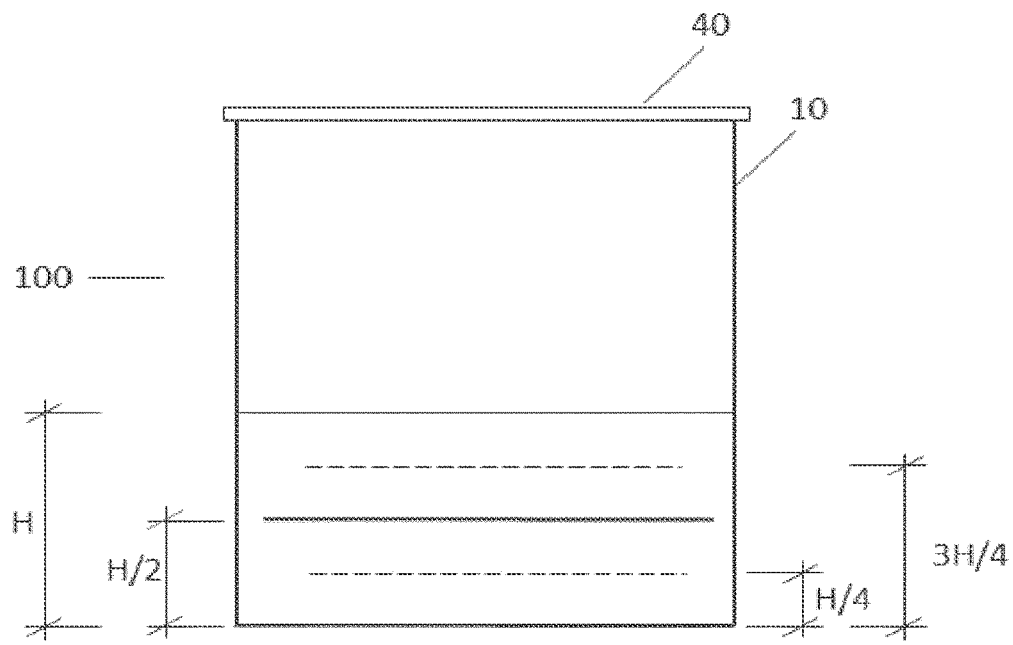

FIGS. 3 and 4 show the shear forces (shear energy) involved in a foaming process with a small whisk (FIG. 3) and with a large whisk (FIG. 4), when the whisks are rotating at the same speed: as it can be seen, shear forces in FIG. 4 (large whisk) are higher than in the case of a small whisk (FIG. 3). Also, the vortex is larger and reaching a higher level in the case of a bigger whisk, shown in FIG. 4.

Also, according to the invention, it is possible to fix the two values mentioned above, i.e. providing a whisk 22 with a diameter comprised between half the size of the inner walls and almost the size of the walls of the container 10, and arranged at a certain distance with respect to the total height of fluid inside the container, this distance being comprised between H/2 and H/4. In this case, it will be the rotational speed at which the whisk 22 will turn inside the container 10, the one ruling whether a liquid foam or a thick foam is obtained. Lower rotational speeds will provide more liquid foam, whereas higher rotational speed will give as a result thicker foams. Still, according to the invention, the parametrization is done in such a way that even higher speeds for obtaining thicker foam will always be much lower than the ones used in the standard devices known in the state of the art.

As typical values, the whisk 22 is typically arranged at a distance comprised between 1 mm and 30 mm from the bottom 11 of the container 10, more preferably between 15 mm and 20 mm and, even more preferably, of around 15 mm or 17 mm. In a more general way, the whisk 22 is distanced from the bottom 11 of the container a distance comprised between 0.025 D to 0.5 D, D being the inner diameter of the container 10. Typically, the container 10 of the invention can have an inner diameter comprised between 50 mm and 150 mm, preferably between 70 mm and 90 mm.

As values for typical rotational speeds of the whisk 22, the invention will rotate the whisk at a speed comprised between 2500 rpm (giving more liquid foam with low bubble size) and 4000 rpm (providing a thicker foam, Chantilly). These values have been tested using a whisk of a large diameter (close to the inner walls of the container) arranged at a distance of H/2 from the bottom 11.

The design of the whisk 22 is made comprising typically undulations or waves that help the foaming. Also, when the whisk 22 is arranged very close to the bottom 11 of the container, typically lower than H/2, more preferably lower than H/4, there is a suction pressure effect that needs to be compensated in order to properly allow the whisk to turn without having too high suction resistance. This suction effect is balanced by the whisk 22 being provided with apertures, preferably apertures that are symmetrically arranged with respect to the shaft 21.

The most typical configuration of the container 10 of the invention is the straight cylindrical one. However, it is also possible that the external shape of the container 10 is made straight cylindrical, while the inner cavity of the container is for example conical-truncated. However, it is clear that any other shape or configuration of the container would also be possible and comprised within the scope of the present invention.

In the following, the description of the present invention is given in view of foaming of milk. However, the invention is not limited to milk as a fluid, but can also be applied to other fluids, e.g. chocolate, coffee, etc. Consequently, other foams different to milk foam can be achieved by the present invention as well. When talking about milk in the present invention, it should be understood not only pure milk but also foaming-based fluids made from foaming agents like caseins, proteins, or others. Also in the present invention, frothing and foaming are to be understood as synonyms.

Figure 2A:
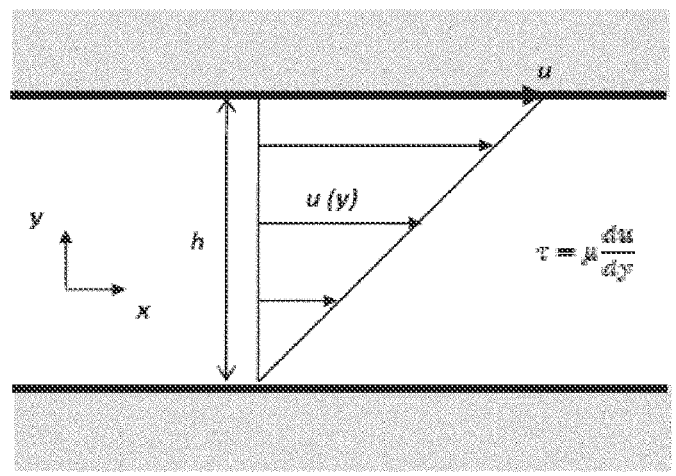
FIGS. 2 a-b show exemplary representations of the couette flow effect used in a foaming device according to the present invention.
Figure 2B:
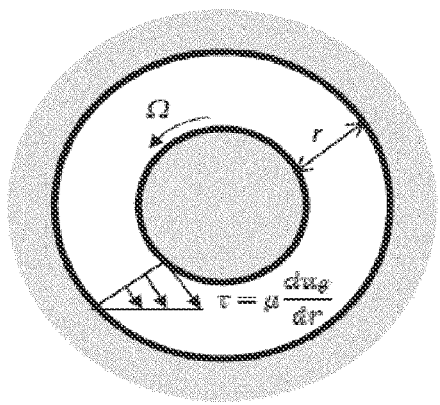

As already mentioned, for foaming a given fluid provided at a given temperature in the container 10, when the whisk 22 is arranged at a certain given distance with respect to the bottom 11 of the container 10, if a smaller whisk 22 is used, then this whisk needs to rotate at a high speed in order to provide high shear stress in the fluid that will be converted into foaming energy: because the distance or gap between the whisk and the inner walls of the container is higher, to obtain a higher velocity gradient, the whisk needs to rotate at a higher speed (see formula of shear stress together with FIGS. 2a-b, the shear stress being a function of the velocity gradient and of the fluid viscosity). When the fluid and its temperature are not changed, and the distance between the whisk 22 and the bottom 11 of the container 10 is also maintained, if the diameter of the whisk 22 is bigger, for providing similar foaming in the fluid, i.e. for providing similar shear stress in the fluid, because the distance between the whisk and the inner walls of the container are much smaller, similar velocity gradient will be provided with lower rotational velocity of the whisk. It would be therefore advantageous to have larger whisks (i.e. a whisk with a larger diameter) that will allow lower rotational speeds. Preferably, the whisk will rotate at a rotational speed comprised between 2000 rpm and 8000 rpm, more preferably 2500 rpm to 4000 rpm.

The foaming device of the present invention uses high shear energy experienced by the fluid (typically milk) together with air inside the container 10 as foaming energy for producing the foam as it will be further explained. The present invention bases on the idea that the foaming energy is provided as high shear energy, achieved by designing the device such that a milk-air mixture is passed at least partly by Couette flow through the device.

Couette flow refers to a laminar flow of a viscous fluid in a space between two parallel plates. The basic principle of Couette flow is shown in FIGS. 2a-b: a movable two-dimensional boundary plate moves with a certain velocity u in respect to a stationary two-dimensional boundary plate. In between the two boundary plates is present a fluid. The movement of the movable boundary plate causes the fluid to move. Two boundary conditions define the movement of the fluid. Directly at the stationary boundary plate, the fluid does not move at all, due to friction forces at the stationary boundary plate. Therefore, the velocity u is zero. Directly at the movable boundary plate, friction causes the fluid to move with the velocity u of the movable boundary plate.

In a simple model, the velocity u of the fluid increases linearly in a direction y measured from the stationary boundary plate. Thereby, a shear stress τ is caused in the fluid, which depends on the distance between the two boundary plates, the viscosity of the fluid, and the absolute velocity of the moving boundary plate. The shear stress in the fluid results in a shear energy, which can be used as foaming energy.

The present invention realizes the above-mentioned principle with a foaming device where the stationary boundary plate is the bottom 11 of the container 10 and the moving boundary plate is the rotating whisk 22.

The main parameters that influence the fluid foam properties in a foaming device 100 according to the invention, for a given temperature and a given fluid, are the following: the rotational speed of the whisk 22, the distance between the whisk 22 and the bottom 11 in the container 10, and the distance between the whisk 22 and the inner walls of the container 10 (directly related to the whisk diameter).

Further, the foaming device of the invention typically comprises a control unit that is able to control certain variables that will influence foaming parameters. In particular, the control unit can control the temperature of the fluid and/or the rotational speed of the whisk 22. Also, the control unit can be configured to control the height at which the whisk 22 is arranged within the container 10 and/or the diameter of the whisk 22 used: depending on these two values, the control unit will thus adjust the rotation of the whisk 22 at a certain speed depending on what kind of foam is targeted, liquid foam or thick foam. Also, the control unit can be configured to control whether the whisk 22 is arranged centred or not within the container 10. As described previously, the control unit can also control the total height H of the fluid in the container 10.

The foaming device of the invention can provide cold, chilled, ambient and/or hot foam. For providing hot fluid foams, the foaming device 100 preferably further comprises a heater which can enhance the foaming effect due to additional available energy and/or protein denaturation. Further, hot milk foam is typically desired for preparing beverages like cappuccino or the like. The heater can be integrated either in the foaming tool 20 or in the container 10 or in the base 30.

The foaming device 100 of the invention can also comprise a lid or cover 40 useful for avoiding splashing when the foaming of the fluid takes place.

For enhancing foaming, the whisk 22 of the device of the invention preferably further comprises one or a plurality of disturbing elements, typically provided in the shape of an undulation. These undulations typically have a depth comprised between 0.5 and 5 mm, more preferably of 1 mm. The undulations are provided in one of the faces of the whisk 22, or on both faces, or can even be provided on the inner walls of the container 10, typically in the lower inner walls where the fluid typically moves.

As depicted in FIG. 1*a*, the one or the plurality of disturbing elements outside the whisk 22, for example under the form of waves, when being in contact with the fluid, creates an upstream and a downstream pressure on the fluid. This reversal stress acting on the chemical compounds of the fluid (proteins and fat globules) in high and low pressure areas thus created facilitates denaturation of proteins and causes bursting of fat globules. Furthermore, waves of the whisk make a ripple effect on bigger chemicals compounds. Even more, the waves allow air incorporation as air bubbles into the liquid which are immediately stabilized by proteins and/or fat globules. A considerable share of expansion work is done on the whisk sides. Depending on the whisk speed moving into the liquid, there exist on the whisk sides shear forces areas where mixing is done. As already described previously, shear forces between the underside of the whisk and the bottom of the container depend essentially on the space that separate them.

The disturbing elements can also be provided in the inner walls of the container 10 or, for example, in the bottom 11 inside the container 10 to increase shear forces within the fluid. Another possibility would be to add disturbing elements in the lower side face of the whisk 22, for example in the shape of a ring, also intended to increase these shear forces in the fluid.

FIG. 4 shows schematically the effect of a large whisk used in a foaming device according to the invention, the whisk diameter being very close to the inner diameter at the bottom 11 of the container 10. Similar effects to the ones described for the example in FIG. 3 occur now. By reducing the distance or gap between the whisk and the side walls of the container, upstream and downstream pressures increase, so shear stress forces are higher. As already explained previously, shear forces are also increased by increasing the whisk diameter (more active surface) and by reducing the distance between the whisk and the bottom of the container: both cases lead to higher velocity gradient, as per what is shown in FIGS. 2*a* and 2*b*.

Although the present invention has been described with reference to preferred embodiments thereof, many modifications and alternations may be made by a person having ordinary skill in the art without departing from the scope of this invention which is defined by the appended claims.

The invention claimed is:

1. A method of producing fluid foam, the method comprising:
   providing fluid in a container;
   producing the fluid foam by rotating a foaming tool in an inner volume of the container to provide a texture and a porosity of the fluid foam by shear energy coming from Couette Flow effect, and the texture and the porosity depend on a dimension of the foaming tool with respect to the inner volume of the container, a fixed height at which the foaming tool is arranged from a bottom of the container, and a rotation speed of the foaming tool; and
   controlling a height of the fluid inside the container such that the fixed height of the foaming tool from the bottom of the container is between ¼ and ¾ of the height of the fluid in the container; and
   forming a first texture of a first foam that is a liquid foam by rotating the foaming tool at a first rotational speed and forming a second texture of a second foam that is a thicker foam than the liquid foam and has a higher size of bubbles than the liquid form by rotating the foaming tool at a second rotational speed, and the second rotational speed is higher than the first rotational speed.

2. The method according to claim 1, wherein the first rotational speed of the foaming tool is between 2500 rpm and 3000 rpm, and the second rotational speed of the foaming tool is between 3500 rpm and 4000 rpm.

3. The method according to claim 1, comprising controlling a height of the fluid inside the container such that the fixed height of the foaming tool from the bottom of the container is between ¼ and ¾ of the height of the fluid in a container, and a control unit is configured to form the first texture of the liquid foam by rotating the foaming tool at the first rotational speed, and the control unit is configured to form the second texture for the thicker foam by rotating the foaming tool at the second rotational speed.

4. The method according to claim 1, wherein a distance between the foaming tool and the bottom of the container is between 0.025 and 0.5 of an inner diameter of the container.

5. The method according to claim 1, wherein the foaming tool is a whisk or a disc, and an inner shape of the container is cylindrical or frusto-conical.

6. The method according to claim 1, wherein the foaming tool is arranged either centred or offset with respect to a centre of the inner volume of the container.

7. The method according to claim 6, comprising using a driving unit comprising a motor mechanically coupled to the foaming tool to entrain the foaming tool in rotation.

8. The method according to claim 6, comprising using a driving unit to generate a magnetic field in response to which the foaming tool is configured to rotate inside the container.

9. The method according to claim 1, comprising using a control unit to control at least one additional parameter selected from the group consisting of (a) a temperature of the fluid and (b) the dimension of the foaming tool with respect to the inner volume of the container.

10. The method according to claim 1, comprising heating the fluid inside the container.

11. The method according to claim 10, wherein the container comprises a heating unit which performs the heating of the fluid in the container.

12. The method according to claim 1, wherein the foaming tool comprises at least one aperture configured to compensate for a suction effect with respect to the bottom of the container.

13. The method according to claim 12, wherein the foaming tool comprises two apertures symmetrically arranged.

14. The method according to claim 1, comprising using one or more disturbing elements arranged on at least one location selected from the group consisting of the foaming tool, inner walls of the container, a lower side of the foaming tool and the bottom of the container.

15. The method according to claim 14, wherein the one or more disturbing elements are configured as undulations having a depth between 0.5 mm and 5 mm.

16. The method according to claim 1, wherein a distance between the foaming tool and the bottom of the container is between 1 mm and 30 mm.

17. The method according to claim 1, wherein the foaming tool is a whisk that extends radially outward toward inner walls of the container, the whisk comprising a whisk diameter that is greater than half a diameter of the inner walls of the container.

18. The method according to claim 1, comprising using a control unit to control whether the foaming tool is arranged centered or not within the container.

19. The method according to claim 1, comprising using a driving unit to drive in rotation the foaming tool inside the container.

* * * * *